Feb. 6, 1968  A. E. VAIL  3,367,632
RAISING AND LOWERING MECHANISM FOR BIRDHOUSE
Filed Oct. 25, 1966  3 Sheets-Sheet 3
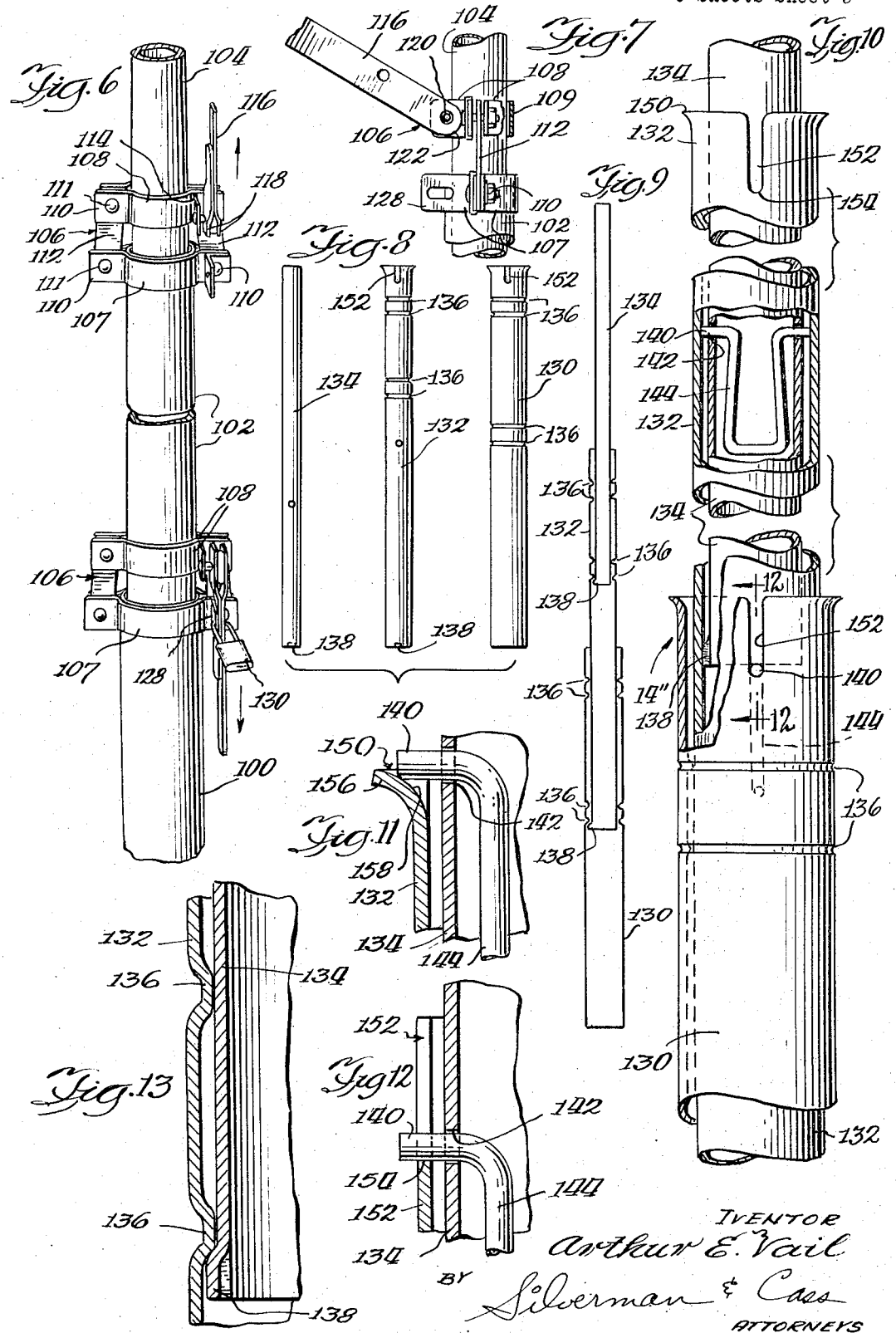
INVENTOR
Arthur E. Vail
BY
Silverman & Cass
ATTORNEYS

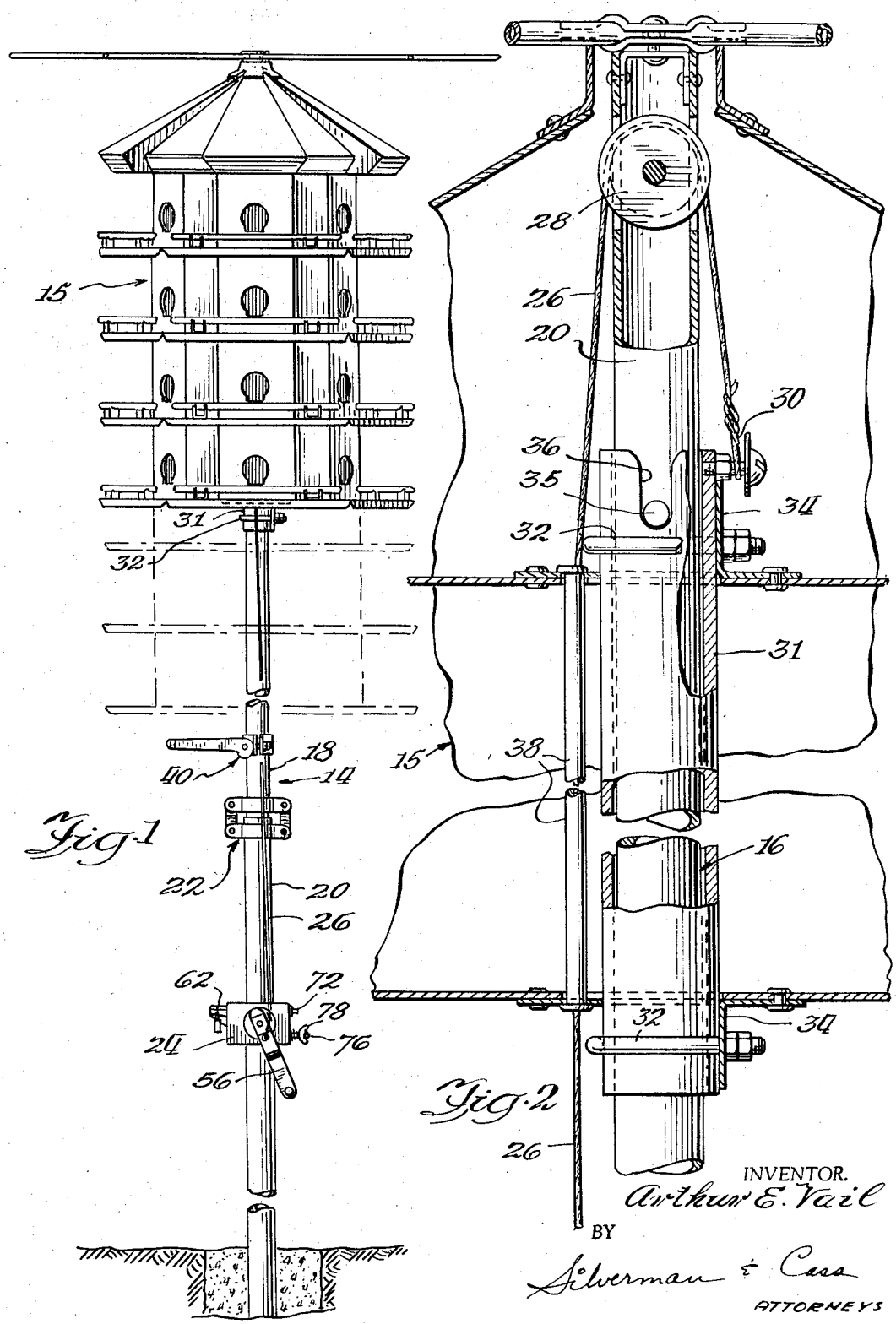

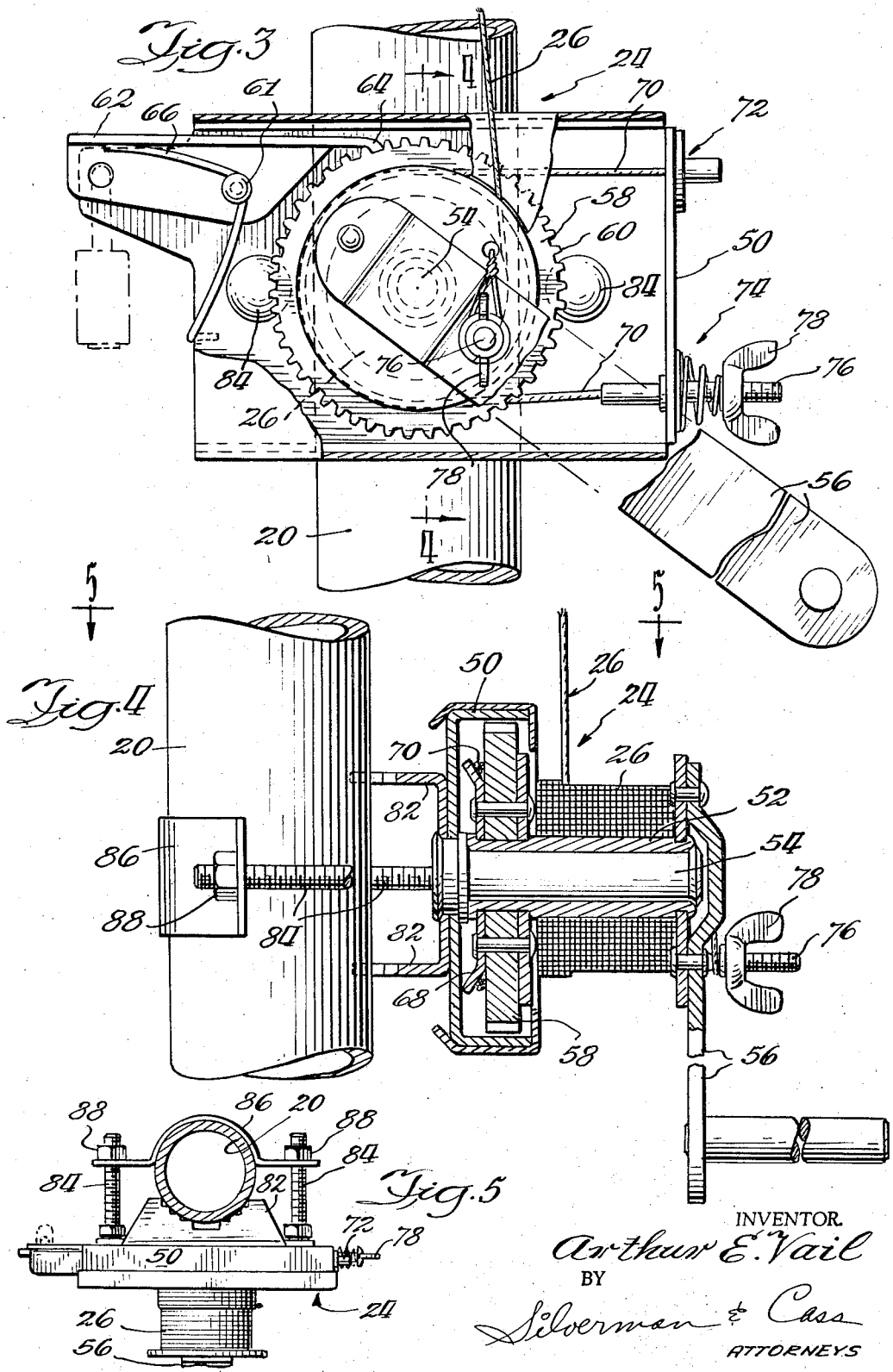

United States Patent Office 3,367,632
Patented Feb. 6, 1968

3,367,632
RAISING AND LOWERING MECHANISM
FOR BIRDHOUSE
Arthur E. Vail, Griggsville, Ill., assignor to Trio Manufacturing Company, Griggsville, Ill., a corporation of Illinois
Filed Oct. 25, 1966, Ser. No. 589,253
7 Claims. (Cl. 254—139)

ABSTRACT OF THE DISCLOSURE

A birdhouse and associated supporting assembly providing for the rising and lowering of said birdhouse relative to the ground level so as to facilitate servicing and cleaning of said birdhouse. The supporting assembly including a mounting pole and selectively operable apparatus associated therewith to effect the raising and lowering of said birdhouse along a path coaxial with said birdhouse.

---

The invention relates generally to mounting poles adapted for use with birdhouses, TV antennas or any other similar structure, and more particularly, to improved mounting pole construction which provide for the mounting of birdhouses, TV antennas or the like at a predetermined height, while further providing for the lowering of said structures to a point where they can be easily serviced from the ground.

The mounting poles of this invention were developed primarily for use with birdhouses for a species of bird known as the "martin." The martin is a gregarious species and a prodigious and effective destroyer of flying insect pests such as mosquitos. It has been determined that a single martin will destroy upwardly of 2,000 mosquitos daily. As the public has become more aware of the beneficial nature of these birds, civic groups, service clubs and individuals have embarked upon campaigns to attract colonies of these birds to residential areas as a method of insect pest control.

The martin is a rather particular bird and the location and construction of the birdhouse is extremely important in attracting the martin as a tenant. The martin is frequently on the wing and prefers a house that is situated between 10' and 15' above the ground. Further the martin is extremely particular as to what birds occupy the birdhouse. If sparrows or certain other species of non-migrating birds nest in the house the martin will refuse to nest, or if already nesting, will soon leave. Thus, the mounting pole for the birdhouse designed to house martins should, for the convenience of the owner, have some provision for raising and lowering the birdhouse so that the nesting compartments may be cleaned in the spring and prepared for the arrival of the martins, and the nests and/or trash of undesirable occupants removed. The mounting poles should also provide means for raising and lowering the birdhouse without disturbing brooding adult birds with newly hatched youngsters.

One type of mounting pole previously used for structures of this type consisted of two vertical poles which were hingedly connected together such that to lower the birdhouse the upper pole was pivoted with respect to the lower pole. This was a cumbersome method in that the house had to be tilted out of the horizontal plane and the nests of any occupants were disturbed.

There has arisen a need for mounting poles that will telescopically mount a birdhouse at a predetermined height above the ground yet will provide access to the structure by allowing it to be lowered to a point where it may be easily serviced from ground level. While the invention will be discussed and described primarily in connection with telescopic mounts for birdhouses, this has been done solely for the purpose of illustration and it is in no way intended as limiting the scope of the invention or the use to which the telescopic mounts, hereinafter described, may be adapted.

Accordingly, it is a primary object of this invention to provide a novel mounting pole which permits a structure to be mounted at a predetermined height while allowing it to be telescopically lowered to ground level for servicing and cleaning without tilting the structure out of the horizontal plane.

A further object of this invention is to provide a telescopic mounting pole structure and joining means therefor which renders the respective sections of the pole collapsible.

A further object of the invention is to provide a joint between two telescoping elements which permits the inner element to be adjustably fixed at various positions with respect to the outer element.

Other objects and advantages of the invention will occur to those skilled in the art as the description therefor develops hereinafter, and from the drawings wherein:

FIG. 1 is a front elevational view of a birdhouse installed on a mounting pole constructed in accordance with the invention.

FIG. 2 is a fragmentary partial sectional view taken through the birdhouse and showing the manner in which the birdhouse is telescopically mounted thereon, the upper portion of the mounting pole being broken away to show interior detail.

FIG. 3 is an enlarged detail of the winch mechanism illustrated in FIG. 2, with the front panels of the winch housing removed.

FIG. 4 is a sectional view taken along the line 4—4 of FIG. 3 and in the direction indicated.

FIG. 5 is a partial sectional view taken along the line 5—5 of FIG. 4 and in the direction indicated.

FIG. 6 is a fragmentary view of modified form of the invention.

FIG. 7 is a fragmentary view of one of the clamping means illustrated in FIG. 6, taken 90° relative the structure thereof and showing said clamp in the open position.

FIG. 8 is a diagrammatic view of three mounting pole sections which make up another modified form of telescopic mount.

FIG. 9 is a diagrammatic view of the elements of FIG. 8 in the assembled condition with the respective elements fully extended.

FIG. 10 is a fragmentary sectional view of the elements of the mounting pole, with portions in elevation showing the telescopic joints between the respective sections.

FIG. 11 is a fragmentary sectional view of the spring biased detent and camming surface of the telescopic joint illustrated in FIG. 10.

FIG. 12 is a fragmentary sectional view taken along the line 12—12 of FIG. 10.

FIG. 13 is a fragmentary sectional view showing the details of the internal ribs and the stop on the outer and inner tubular elements, respectively.

Referring now to the drawings, one embodiment of the mounting pole according to the present invention is illustrated in FIGS. 1 and 2. The mounting pole is designated generally by the reference character 14. In the illustrated form of the invention the mounting pole 14 supports a birdhouse 15, which may be of any desired construction, so long as it is provided with an interior vertically arranged passageway 16 extending therethrough. As best viewed in FIG. 2 the passageway 16 telescopically receives the mounting pole 14 to slidably mount the birdhouse 15 thereon.

More specifically referring to FIG. 1 the pole 14 is illustrated as comprised of two telescopically mounted tubular sections 18 and 20 which are maintained in a fixed position with respect to each other by a clamp 22. Whether the pole 14 is comprised of a single unitary tubular section or a plurality of telescopically mounted sections is obviously a mere question of design, either modification being envisioned in the instant invention. On the lower portion of the tubular section 20 there is mounted a winch 24 which is effective to raise and lower the birdhouse as more fully explained hereinafter. The winch is illustrated in detail in FIGS. 3 and 4. Attached to the winch 24 is a cable 26 which extends upwardly into and through the birdhouse 15 and is engaged over an idler roller or pulley 28, FIG. 2, and is then connected to the birdhouse 15 at 30. From the above it is obvious that the arrangement is such that the operation of the winch 24 will cause the birdhouse 15 to be raised or lowered on the pole 14.

While the construction of the birdhouse 15 may take any form, provided it has a central interior passageway, the preferred form of the invention is illustrated in FIG. 2. The central passageway 16 is defined by a tubular guide or sleeve 31 which is positioned in and attached to birdhouse 15 by means of U-bolts 32 and brackets 34 mounted on the birdhouse 15. The inner diameter of the tubular guide 31 is significantly larger than the outer diameter of the mounting pole 14 so that there is freedom of telescopic movement without the danger of binding or freezing. The upper portion of the tubular section 20 is provided with a detent 35 which protrudes radially outwardly therefrom and acts as a stop to limit the upward travel of the birdhouse. The tubular guide or sleeve 31 is provided with a notch 36 in its upper end which is adapted to receive the detent 35 to prevent relative rotation between the pole 14 and the birdhouse 15 when said detent is engaged therein. In addition to the tubular guide 31 for pole 14, the birdhouse is preferably provided with a second tubular guide 38 which receives the cable 26. While the guide 38 is not necessary, mere apertures in the respect of floors of the house 15 being sufficient, it is preferred since the guide 38 protects the cable from damage by engagement with the relatively sharp edges of the aforesaid apertures.

In the lower portion of FIG. 1 there is illustrated a safety clamp 40. The purpose of the clamp 40 is to provide a safety device which will, in the event that the cable 26 breaks, or the winch 24 slips, prevent the house from falling on anyone who might be standing under the house. Since it is desirable to service the house from ground level, and since the clamp 40 must be released before the house is lowered to a position for servicing, the clamp is normally placed about 6 or 6½ feet above the ground so that it is readily accessible therefrom. The clamp 40 is preferably a quick disconnect cam lever operated clamp that can easily be detached, slid along the length of the pole, and reattached at various positions along the pole 18. The structure of the quick disconnect cam lever features of the clamp are essentially the same as those illustrated in FIGS. 6 and 7, which will be more fully discussed hereinafter.

In FIGS. 3–5 the preferred form of winch for use with the mounting pole of FIGS. 1 and 2 is illustrated in detail. The winch which has been designated generally 24 in FIG. 1 is comprised of an outer casing or housing 50 which has a reel or drum 52 rotatively secured thereto. The rotatable reel 52 is secured to the housing 50 by a pin 54 which is fixedly attached to housing 50 and provides an axle for the rotatable reel 52. The reel 52 receives and stores thereon a substantial quantity of cable 26, and is provided with a handle assembly 56 for the rotation thereof to effect the winding and unwinding of the cable 46 thereon.

The winch assembly 24 is provided with both a locking mechanism and a drag control mechanism for the reel 52. The locking mechanism is of a releasable nature and in the form of a ratchet, whereby it allows the reel to rotate in the direction for winding the cable thereon, but prevents rotation in the opposite direction. To unwind the cable the locking or ratchet mechanism must be manually released and at this point the drag control will come into play to prevent uncontrolled unwinding of the cable under the weight of the birdhouse, which could be dangerous to the operator and could also foul the winch mechanism. The drag control mechanism is such that it allows the drag on the reel 52 to be adjusted so that when adjusted to the proper tension it will be sufficient to maintain the house in position without the ratchet lock, but will allow the reel to turn in the direction to effect raising of the birdhouse.

Referring to FIGS. 3 and 4, the ratchet or locking mechanism comprises a gear 58 fixedly attached to reel 52, said gear 58 having teeth or cogs 60 on the outer periphery thereof. A locking arm 62 is pivotally attached to the housing 50 at point 61 and is provided with a flanged end portion 64 adapted to engage cogs 60. The arm 62 is biased by torsion spring 66 which tends to pivot said arm in a clockwise direction so as to force the flanged end 64 into engagement with the cogs 60. It can be seen that rotation of the reel 52 and gear 58 in a clockwise direction, the direction effecting the winding of the cable 26 is permitted since the end flange 64 will be biased out of engagement with cogs 60, against the action of the spring 66. Rotation in the opposite direction is positively prevented and can be effected only upon the manual release of the locking flange 64 from the cogs 60.

As mentioned previously, in the lowering of the birdhouse it is desirable to have a certain amount of drag on the reel 52 to prevent uncontrolled unwinding. The drag control apparatus is comprised of a flanged disc 68 which is fixedly attached to the gear 58 and cooperates therewith to define an annular channel. Engaged in a portion of said channel is a drag cable 70 which has one end attached to housing 50 at point 72, the other end being adjustably secured to housing 50 as shown generally at terminal 74. The cable 70 has a threaded end fitting 76 adapted to be engaged by wing nut 78. A coil spring 80 is mounted, coaxial with fitting 76, between the housing 50 and the wing-nut 78 and provides cable 70 with a certain amount of play. The drag on the reel 52 can be controlled by varying the tension in the cable by adjusting the spring biased nut 78.

With reference to FIG. 3, it is evident that the handle 56 must rotate in the counter clockwise direction to lower the birdhouse. With the tension in the cable 70 properly adjusted, the tendency of the reel 52 to rotate in the counter clockwise direction will be such as to increase the tension in the upper section of the cable 70, and since there is no give in the connection at point 72 this will increase the drag on said reel. Whereas, when the handle 56 and reel 52 are rotated in the clockwise direction, the tension or pull on the cable 70 will be in the lower portion thereof. Since the attachment of this lower portion of the cable is effected by the spring biased wing nut 78, which affords a certain amount of give or play, the drag on the reel 52 will be decreased and rotation thereof is possible.

Referring now to FIGS. 4 and 5, the housing 50 is provided with a pair of channeled flanges 82 having gripping teeth thereon in engagement with the tubular element 20. The housing 50 further is provided with a pair of threaded mounting studs 84 positioned on each side of the flanges 82. The winch 24 is mounted on the tubular element 20 by the use of a flanged semi-circular mounting clamp 86 which is engaged over and attached to the mounting studs 84 in such a manner that rotation of the threaded nuts 88 will tend to draw the channeled mounting flanges 82 into tight engagement with the tubular element 20.

Obviously any type of winch could be used with the form of the invention as illustrated in FIGS. 1 and 2. The above discussion of the preferred type of winch, illustrated in FIGS. 3–5 is in no way intended to limit the invention as disclosed in FIGS. 1 and 2.

In the embodiment of the invention illustrated in FIGS. 1 and 2, the pole 14 is formed of a pair of telescopic poles 18 and 20 fixedly joined by clamp 22. However, various forms of telescopic joints may advantageously be used to provide an adjustable connection between the respective tubular elements which comprise the pole 14. In FIGS. 6 to 13 other telescopic arrangements are illustrated for joining the respective sections of the mount pole 14.

The invention contemplates means other than the winch arrangement 24 to raise and lower a structure such as birdhouse 15 which is telescopically received on a mounting pole. In another form of the invention, the birdhouse may be fixedly or telescopically secured to the upper tubular section and the respective sections telescoped one relative the other to effect the lowering of the birdhouse. Telescopic mounting pole arrangements of this nature are illustrated in FIGS. 6–13. It must be further understood, the invention has been described with respect to mounting pole arrangements for birdhouses, but is equally applicable for use to mount TV antennas, or, as flag poles, tent poles or even clothes line poles.

Referring to FIGS. 6 and 7, there is illustrated one form of adjustable mounting pole adapted for use with a birdhouse, or for any of the above enumerated uses. The pole 14′ is comprised essentially of three telescopic sections 100, 102 and 104. The respective sections are slidably received one within the other and the upper ends of the two lowermost sections are provided with clamping arrangements 106 that releasably engage the respective inserted section to maintain it in the extended position. One clamping arrangement 106 will be described in connection with the joint between sections 102 and 104. The clamp 106 is best viewed in FIG. 7 and is formed of upper and lower clamping sections 107 and 108 adapted to engage poles of different diameters. Each clamping section is comprised of a pair of arcuate clamp members 109 which have apertured depending ears or flanges 110 on the ends thereof. The lower clamping section 107 is attached to the end of the larger of the two telescoped mounting pole sections by a suitable nut and bolt arrangement 111 which draws the respective clamping members 109 together and into tight engagement with the tubular section 102. Clamping sections 107 and 108 are secured one to the other by a pair of intermediate supporting elements 112 which may be positioned between, and attached to, respective flanges 110 by the nut and bolt arrangements 111. The upper clamping section 108 has one set of its juxtaposed flanges 111 joined together by a nut and bolt type holding arrangement 110, similar to that used with the lower clamping section 107. The other set of juxtaposed flanges is joined by a quick disconnect cam lever type coupling means.

The quick disconnect cam lever type coupling means is comprised of an eye-bolt 112 which is inserted through apertures in the flanges 111 and has a nut 113 attached to the threaded end thereof, and in engagement with the flange 111 adjacent thereto. Attached to the other flange 111 is a mounting bracket 114 for supporting a cam lever 116. The cam lever 116 has a bifurcated end section 118 which receives the head of the eye-bolt 112. Joining the respective elements of the quick disconnect coupling is a guide pin 120 which is received through the bifurcated elements 118 of the cam lever 116, the head of the eye-bolt 112 and the mounting flange 114, so to pivotally mount the cam lever 116 thereon.

The ends of the bifurcated section 118 are provided with cam faces 122 which are adapted to engage the flange 111 adjacent thereto so that upon pivoting of the cam lever 116 to a closed position, the flanges 111 and the associated arcuate clamping members 109 are drawn together. Thus the clamping member 109 is caused to engage the inner tubular section 104, and since the respective upper and lower clamps 107 and 108 are attached together by the supporting element 112, effectively the relative positions of inner tubular section 104 and outer tubular section 102 is fixed. If desired, the lower clamp 107 may be provided with a locking flange 128 that will lie adjacent the lever 116, when the cam lever is in a closed position. The lever 116 and the locking flange 128 are provided with aligned apertures which are adapted to receive a locking device 130. This arrangement is used when it is desired to retain the cam lever in the closed position to prevent inadvertent lowering of the telescopic members or unauthorized operation thereof.

In operation the cam lever 116 is thrown to the open position as shown in FIG. 7. In this position the arcuate clamping members 109 will not engage the inner mounting pole section 104 and said section is free to slide up and down within the section 102. The operator then selects the desired height to which the pole section 102 is to be extended and pivots the lever 116 to the closed position. This will cause the cam faces 122 to engage the flange 111 adjacent thereto and to force it toward the juxtaposed flange 111 of the other clamping member to cause the clamping members 109 firmly to engage the pole 104 in fixed position with respect to pole 102.

In FIGS. 8–13 there is illustrated another form of the invention incorporating a modified mounting pole arrangement. FIG. 8 shows a three section mounting pole 14″ in its unassembled state. The pole is comprised of sections 130, 132 and 134, which are of progressively decreasing inner diameters respectively so as to enable the sections telescopically to be engaged. In FIG. 9, the respective sections are illustrated in their engaged, fully extended position. It is noted that the upper portions of sections 130 and 132 are provided with internal circumferential ribs 136, while the lower ends of sections 132 and 134 are provided with an outwardly extending protuberance or stop 138. As illustrated, in FIGS. 9 and 13 the stop 138 will engage the lowermost internal rib 136 to prevent total withdrawal of the inner section from the outer section. The internal ribs 136 serve a two-fold purpose: first, they prevent disengagement as discussed above; and second, they extend inwardly closely to engage the inner tubular section and thus provide a support to prevent wobbling of the respective sections.

The means for interconnecting the respective sections, 130, 132, and 134, in the extended position are illustrated in FIGS. 10–12. FIG. 10 is a fragmentary sectional view of a mounting pole 14″ with the section 132 in the fully extended position and the uppermost section 134 received in section 132 to the fullest degree of telescopic engagement permitted. FIGS. 11 and 12 illustrate the coupling arrangement of the invention and the means to effect engagement and disengagement thereof.

The coupling of this form of telescopic mounting pole is best illustrated in the upper portion of FIG. 10 and in the fragmentary sectional views of FIGS. 11 and 12. The mounting pole section 132 is provided with a pair of spring-biased detents 140 which are supported in the diametrically opposed apertures 134 and the walls of said tube. In the illustrated form of the invention the detents 140 are mounted on the ends of a U-shaped spring 144 which tend to bias the detents 140 outwardly. Obviously, various types of spring-biasing arrangements can be used instead of the illustrated U-shaped spring 144. In the telescoped position as shown in the upper portion of FIG. 10, the detent 140 will be in engagement with the inner wall of the outer tubular section 134. As the inner tubular section 132 is extended, the detents 140 will engage the internal ribs 136, but due to the tapered shape of these ribs, the detents 140 will be cammed inwardly to allow passage thereof. In the fully extended position the stops 138 of the inner tubular section 134 will engage the lowermost internal ribs 146 of the outer tubular section 132 to prevent total withdrawal, and the detents 140 will be spaced slightly above the upper edge 150 of the outer section 132. The respective sections are then rotated to align the detents 140 with the diametrically opposed axial slots 152 which are formed in the upper edge 150 of the outer tubular element 132. The inner section 134 is then lowered to position the detents 140 on the shoulders 154 which are provided by the terminal end of the slots 152. This may be viewed best in FIG. 12.

To provide for the telescoping of the inner tubular section 134 into the outer tubular section 132 and the disengagement of the detents 140 from the slots 152, the upper edge 150 of tubular element 132 is provided with a flared portion 156. The flared portion 156 extends radially outward a distance greater than the detents 140 and is further provided with a rounded or tapering surface 158 which acts as a cam surface to bias the detents 140 inwardly. To disengage the elements 132 and 134 from their extended position it is merely necessary to raise the inner tubular section 132 to a position wherein the detents 140 are above the mouth of the respective slots 152. The section is then rotated to positions wherein the detents 140 are in registration with the cam surfaces 158. The inner tubular section 134 is then lowered, the cam surfaces 158 engaging the detents 140 and biasing them inwardly to allow the tubular section 134 to be received in tubular section 132.

The coupling of tubular section 130 to section 132 is identical to that as described above in regard to the coupling between sections 132 and 134. The telescopic mounting poles, obviously, may be comprised of any number of sections depending upon the desired final height of the pole.

Thus, with the telescopic mounts of FIGS. 1–13 a birdhouse or like structure can be mounted at a predetermined distance above the ground and can be easily lowered to a height where an individual can service the birdhouse while remaining on the ground. It is apparent that various changes and modifications can be made in the construction and arrangement of the mounting poles within the spirit and scope of the invention. Further, the use to which the mounting poles may be put or the environment in which they are used may take various forms. It is intended that such changes, modifications and various uses be included within the scope of the appended claims.

What it is desired to be secured by Letters Patent is:

1. In combination, a birdhouse and a supporting assembly for mounting said birdhouse at a predetermined height above ground level; said birdhouse having a first central passageway extending therethrough and a second passageway offset from said first passageway, said supporting assembly including, a mounting pole telescopically received in said central passageway thereby slidably mounting said birdhouse thereon, positioning means operable to raise and lower said birdhouse along the length of said pole relative to said ground, said positioning means comprised of an idler roller mounted on the upper portion of said pole, a cable engaged over said idler roller having one end thereof attached to said birdhouse and the other end passed through said second passageway and extending away from said birdhouse, and a winch mechanism mounted to the lower extremity of said pole and having the said other end of said cable attached thereto, said winch mechanism being operable to effect said raising and lowering of the birdhouse, said first central passageway and said offset passageway being defined by tubular sleeve members which telescopically receive said mounting pole and said cable, respectively, and said tubular sleeve for the central passageway being provided with an axially extending notch in the upper end thereof, and said mounting pole being provided with a detent adapted to be engaged in said notch to limit the upward travel of said birdhouse and prevent relative rotation between said birdhouse and said mounting pole.

2. A combination as defined in claim 1 wherein said mounting pole is comprised of a plurality of telescopically engaged tubular elements, said elements being provided with coupling means at the junction of any two of said elements to lock said elements in a predetermined telescopic relationship.

3. A combination as defined in claim 2 wherein said coupling means comprises a first clamp fixedly engaged about the outer one of said telescoping sections, and a second clamp selectively engaged about the inner one of said telescoping sections, means interconnecting said first and said second clamps whereby when said second clamp is in engagement with the inner of the two telescoping sections, relative movement therebetween is precluded, said second clamp being comprised of an open ended clamping member having a pair of end flanges extending radially therefrom, and cam means associated with said open ended clamp member and adapted upon operation thereof to force said flanges together to effect engagement of said clamp about said section.

4. In combination, a birdhouse and a supporting assembly for mounting said birdhouse at a predetermined height above ground level, said assembly comprising a mounting pole supporting said birdhouse thereon and having positioning means associated therewith to effect the raising and lowering of said birdhouse relative to the ground and coaxial with the mounting pole, said pole being comprised of a plurality of sections telescopically interengaged with quick connect-disconnect means at the point of juncture of any two telescopic sections operable to lock said sections in an extended position and releasable to permit said sections to telescope, said quick connect-disconnect means being comprised of at least one spring-biased detent mounted in the outer wall of the inner one of said telescopic sections, an axial slot in the upper end of the outer of said telescopic sections adapted to receive said detent therein to prevent telescopic and rotative movement of said sections, and a flared portion on the upper end of said outer section, said flared portion defining a tapered surface for engaging said detent to cam same inwardly thereby permitting telescopic movement of said sections.

5. A combination as defined in claim 4 wherein said birdhouse is fixedly secured to the uppermost one of said plurality of telescopically interengaged sections, and said quick disconnect means constitutes the positioning means for effecting raising and lowering of said birdhouse.

6. A combination as defined in claim 4 wherein said birdhouse includes a first passageway extending centrally thereof and a second passageway offset from said first passageway, said mounting pole telescopically received in said central passageway to adapt said birdhouse for slidable movement therealong, said positioning means including an idler roller mounted in the upper portion of said pole, a cable engaged over said idler roller and having one end attached to said birdhouse and the other end passed through said second passageway, and a winch mechanism mounted to the lower extremity of said pole and having said other end of said cable attached thereto, said winch mechanism being operable to effect said raising and lowering of the birdhouse.

7. An assembly for mounting a birdhouse in a predetermined height above ground level, said birdhouse having a central passageway extending therethrough, said assembly comprising in combination; a mounting pole telescopically received in said central passageway; positioning means operable to raise and lower said birdhouse with respect to the ground level coaxially of the mounting pole, said positioning means including an idler roller mounted on the upper portion of said pole, a cable engaged over said idler roller having one end attached to said birdhouse, a winch mechanism mounted to the lower extremity of said pole and having the other end of said cable attached thereto, said winch mechanism being comprised of a housing, a reel rotatably mounted to said housing and having the said other end of the cable attached thereto, ratchet means associated with said reel and housing to control the rotation of said reel, drag control means associated with said reel and housing and comprised of an annular groove formed on said reel, a drag cable attached to said housing and engaged in said groove and means associated with said cable for varying the tension therein and thus controlling the drag on said reel.

References Cited

UNITED STATES PATENTS

| | | | |
|---|---|---|---|
| 28,380 | 5/1860 | Knocke | 187—11 |
| 900,899 | 10/1908 | Townsend | 52—111 |
| 1,845,143 | 2/1932 | Friesner | 287—58 |
| 2,427,841 | 9/1947 | Dichter | 287—58 |
| 2,556,348 | 6/1951 | Thompson | 287—58 |
| 2,991,495 | 7/1961 | Blalack | 287—58 |
| 3,145,690 | 8/1964 | Bachman | 119—51 |
| 3,187,722 | 6/1965 | Gilmore | 119—51 |
| 3,301,217 | 1/1967 | Prowinsky | 119—51 |

ANDRES H. NIELSEN, *Primary Examiner.*

EVON C. BLUNK, *Examiner.*

H. C. HORNSBY, *Assistant Examiner.*